United States Patent [19]

Duhaime

[11] 4,298,105
[45] Nov. 3, 1981

[54] CONTROL VALVE MECHANISM FOR A POWER TRANSMISSION

[75] Inventor: Michael L. Duhaime, Detroit, Mich.

[73] Assignee: General Motors Corporation, Detroit, Mich.

[21] Appl. No.: 94,692

[22] Filed: Nov. 16, 1979

[51] Int. Cl.³ .............................................. B60K 41/24
[52] U.S. Cl. .................... 192/3.23; 192/3.27; 192/3.31; 192/3.24; 74/868
[58] Field of Search ..................... 192/3.23, 3.24, 3.25, 192/3.26, 3.3, 3.32, 3.57, 4 A, 12 C, 13 R, 87.13, 87.12, 87.11, 3.27, 3.31; 74/752 A, 752 C, 868

[56] References Cited

U.S. PATENT DOCUMENTS

| | | | |
|---|---|---|---|
| 3,693,478 | 9/1972 | Malloy | 192/3.31 X |
| 3,985,046 | 10/1976 | Morris et al. | 192/3.31 X |
| 4,142,614 | 3/1979 | Fujioka | 192/4 A |

Primary Examiner—George H. Krizmanich
Attorney, Agent, or Firm—Donald F. Scherer

[57] ABSTRACT

An electro-hydraulic control for a power transmission has a solenoid controlled shift valve and a hydraulic controlled shift valve. Preferably, the solenoid controlled valve controls the control clutch while the hydraulic controlled valve controls the clutch or brake which is effective to establish a drive ratio in the transmission. When a ratio change involving the disengagement of the clutch or brake occurs, the exhaust fluid therefrom operates on an electrical switch which is effective to provide momentary disengagement of the torque converter clutch.

4 Claims, 2 Drawing Figures

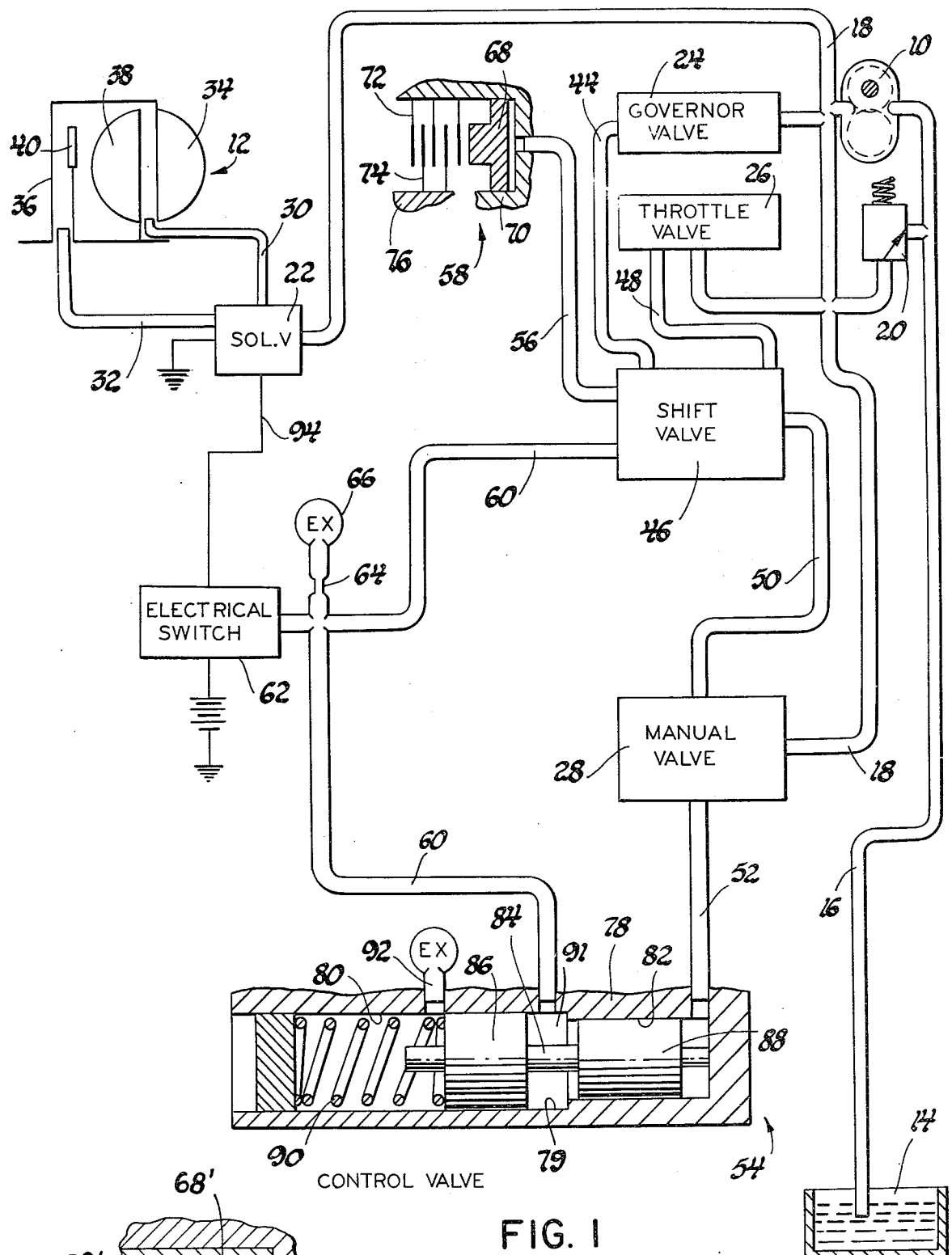
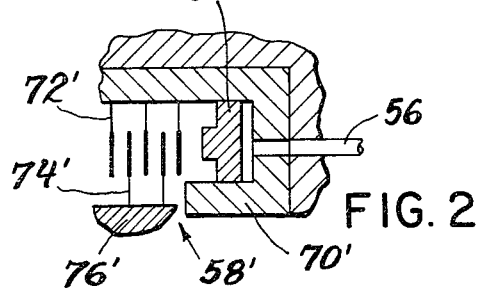
FIG. 1
FIG. 2

CONTROL VALVE MECHANISM FOR A POWER TRANSMISSION

This invention relates to control mechanisms and more particularly to hydraulic control mechanisms for automatic transmissions.

In an effort to provide improved transmission efficiency and thereby increase fuel mileage for vehicles, it is proposed to provide a torque converter clutch which will be effective to directly couple the input and output members of a torque converter or fluid coupling thereby eliminating the inefficiency of this hydraulic device. It is considered that the torque converter clutch must be engaged for more than one gear ratio to obtain maximum benefit from such a device. Accordingly, in a four-speed transmission, the torque converter clutch would be engaged at least in the third and fourth gear ratios and preferably in the second, third and fourth gear ratios.

When a downshift from the highest ratio to an underlying ratio occurs, it is desirable to momentarily disengage the torque converter clutch during the ratio change to permit the shift energy to be accommodated by the torque converter rather than by a positive drive connection such as a clutch.

The present invention will permit such a sequence of events to occur during a downshift in a transmission incorporating a torque converter clutch. The same or similar control systems can be utilized in any power transmission wherein it is desirable to momentarily disengage a drive establishing device such as a clutch or brake during a ratio interchange and to subsequently reengage the device upon completion of the ratio change.

It is therefore an object of this invention to provide an improved control valve mechanism for a power transmission wherein a friction drive establishing device is momentarily disengaged during a ratio change and reengaged after the ratio change.

It is another object of this invention to provide an improved control valve mechanism for a power transmission wherein a clutch member is controlled by a solenoid valve to be momentarily disengaged in response to a disengagement of another clutch or brake within the drive system when the other clutch or brake is disengaged to effect a ratio change within the transmission.

A further object of this invention is to provide an improved valve control mechanism for a power transmission wherein a solenoid controlling a torque converter clutch is actuated in response to the exhausting of a ratio drive establishing device to momentarily disengage the torque converter clutch during a ratio change involving the drive establishing device.

Another object of this invention is to provide an improved control valve mechanism for a power transmission wherein a solenoid controlled torque converter clutch is momentarily disengaged during a ratio interchange in the power transmission by controlling the exhaust pressure of an off-going friction device in such a manner as to actuate a pressure responsive electrical switch which controls the solenoid to momentarily disengage the torque converter clutch during the ratio interchange.

These and other objects and advantages of the present invention will be more apparent from the following description and drawings in which:

FIG. 1 is a diagrammatic representation of a control system utilizing the present invention; and FIG. 2 is a diagrammatic representation of a brake structure replacing the clutch structure shown in FIG. 1.

Referring to the drawings, there is shown a conventional gear pump 10 which is driven, in a conventional manner by a conventional torque converter 12 to supply high pressure fluid to a hydraulic control system. The pump 10 takes fluid from a reservoir 14 through a passage 16 and delivers the fluid at a high pressure to passage 18. The maximum fluid pressure in passage 18 is established by a conventional pressure regulator valve 20 which exhausts excess fluid into passage 16. The passage 18 is connected to a solenoid valve 22, a governor valve 24, a throttle valve 26 and a manual control valve 28. The solenoid valve 22 is a conventional solenoid valve which is operative to selectively supply fluid pressure from passage 18 to either fluid passage 30 or 32 depending on the electrical condition of the solenoid. Both the passages 30 and 32 are connected to the torque converter 12. The passages, when not pressurized, are connected to exhaust.

The torque converter 12 has an impeller 34 which is driven by an input shell 36 and a turbine 38 which is effective to drive a planetary gearing in a transmission, not shown, in a conventional manner. The use of drive connections between torque converters and planetary gearing arrangements is well-known and, for the purposes of the present invention, the drive connection as shown in U.S. Pat. No. 3,724,292 issued to Borman on Apr. 3, 1973, or U.S. Pat. No. 3,321,056 issued to Winchell et al on May 23, 1967, is considered illustrative.

Also incorporated within the torque converter 12 is a torque converter clutch 40 which may be constructed in accordance with the torque converter clutch as shown in U.S. Pat. No. 3,252,352 issued to General et al on May 24, 1966. The fluid passage 30 is selectively connected to deliver fluid to the torque converter 12 in such a manner as to engage the torque converter clutch 40; and the fluid passage 32 is connected to direct fluid to the torque converter 12 in such a manner as to disengage the torque converter clutch 40. Such fluid connections are shown in the above-mentioned General et al patent and similar control systems can be seen in U.S. Pat. No. 3,730,315 issued to Annis et al on May 1, 1973, and U.S. Pat. No. 3,693,478 issued to Malloy on Sept. 26, 1972.

The governor valve 24 may be constructed in accordance with that shown in U.S. Pat. No. 3,559,667 issued to Koivunen on Feb. 2, 1971, or in accordance with any of the well-known governor valve structures. The throttle valve 26 may be constructed in accordance with any of the well-known throttle valves or in accordance with that shown in U.S. Pat. No. 3,893,472 issued to Schuster on July 8, 1975. The governor valve 24 generates a pressure signal, in proportion to vehicle speed, which is delivered to a fluid passage 44. The passage 44 is connected to a conventional shift valve 46 which may be constructed in accordance with the three-four shift valve shown in U.S. Pat. No. 3,724,292. The throttle valve 26 generates a pressure signal, proportional to throttle position, which is delivered through passage 48 to the shift valve 46.

The manual valve 28 may be constructed in accordance with any of the well-known hydraulic manual valves utilized in power transmissions. The manual valve 28 is effective to distribute pressure from passage 18 to either a passage 50, which is connected to the shift valve 46 are a passage 52, which is connected to a control valve 54, depending upon the drive ratio selected by the operator. If an automatic drive sequence is selected by the operator, passage 50 will be pressurized and passage 52 will be exhausted. If a drive range less than automatic (for example, the low or intermediate ratio in a three-speed transmission) are selected, the passage 52 is pressurized.

The shift valve 46 has an outlet passage 56 which is connected to a friction device 58 and an exhaust passage 60 which is connected to the control valve 54 to a pressure switch 62 and, through a flow restriction 64, to an exhaust port 66. As is well-known with transmission shift valves, when the governor pressure in passage 44 is sufficient to overcome the throttle pressure in passage 48, the shift valve 46 will upshift and provide a fluid connection between the passage 50 and passage 56 which will be effective to engage the friction device 58. In the event that the relationship between governor pressure and throttle pressure changes sufficiently to permit the shift valve 46 to downshift, the passage 56 will be connected to passage 60.

The friction device 58, shown in FIG. 1, is a conventional fluid operated friction device operating as a clutch having a piston 68 slidably disposed in a housing 70 and a plurality of interleaved friction plates 72 and 74 which are respectively connected to the housing 70 and a hub 76 in a well-known manner. When passage 56 is pressurized, the piston 68 enforces engagement of the friction discs 72 and 74 thereby providing a friction connection between the housing 70 and the hub 76 such that a rotary drive is provided.

The friction device 58', shown in FIG. 2, is a conventional fluid operated friction device operating as a brake having a piston 68' slidably disposed in a housing 70' and a plurality of interleaved friction plates 72' and 74' which are respectively connected to the housing 70' and a hub 76' in a well-known manner. When passage 56 is pressurized, the piston 68' enforces engagement of the friction discs 72' and 74' thereby providing a friction connection between the housing 70' and the hub 76' such that a stationary reaction member is provided.

The control valve 54 includes a housing 78 having a stepped bore 79 with a large diameter 80 and a small diameter 82 in which stepped bore 79 is slidably disposed a spool valve 84. The spool valve 84 has a large land 86 cooperating with diameter 80 and a small diameter land 88 cooperating with diameter 82. A compression spring 90 is operative to urge the valve spool 84 rightward in bore 79 as shown.

The fluid passage 52 is connected to the diameter 82 and is effective to supply fluid pressure to operate on the right end of land 88. The passage 60 is connected to the housing 78 so as to supply fluid to the differential area 91 formed in the bore 79. An exhaust passage 92 is also connected to the diameter 80. When the passage 52 is pressurized, the valve spool 84 will move leftward against spring 90 to provide an unrestricted fluid communication between passage 60 and exhaust passage 92 in the space provided by the differential area 91. This will occur when the operator selects some drive ratio other than automatic drive as described above.

The passage 60 will be pressurized whenever ratio interchange occurs within the transmission requiring the disengagement of friction device 58. During the disengagement of friction device 58, the volume of fluid required to maintain the piston 68 activated is exhausted through the passage 60. The fluid pressure in passage 60 operates on the differential area 91 to move the valve spool 84 to the left and thereby provide a controlled connection between the passage 60 and exhaust passage 92. The differential area 91 and spring 90 are designed such that a minimum pressure, for example, 30 psi, is maintained within the passage 60. However, the passage 60 is always in communication with exhaust through restriction 64. Thus, when the friction device 58 is disengaged, the exhaust pressure will be substantially instantaneously reduced to 30 psi and will thereafter decay at a rate determined by the size of restriction 64.

The electrical switch 62 is a conventional pressure sensitive switch which, when activated by the fluid pressure level in passage 60, is effective to provide an electrical signal through electric line 94 to actuate the solenoid in such a manner as to ensure that fluid pressure is directed to passage 32 thereby disengaging the torque converter clutch 40. The electrical switch 62 is preferably designed to be actuated by fluid pressure of 5 psi or greater. Thus, during the initial disengagement of friction device 58, the fluid pressure in passage 60 will actuate the electrical switch 62 thereby causing operation of the solenoid 22 resulting in disengagement of the torque converter clutch 40. As the fluid pressure in passage 60 decays, the ratio interchange requested by the transmission control will be completed and the fluid pressure in passage 60 will approach 0 psi. When the fluid pressure in passage 60 is below the threshhold level of electrical switch 62, the electrical switch 62 will operate so as to cause the solenoid 22 to be activated in such a manner as to exhaust passage 32 while pressurizing passage 30 thereby reengaging the torque converter clutch 40.

Should the operator manually downshift the transmission, the fluid pressure in passage 52 will operate the control valve 54 in such a manner as to provide a substantially unrestricted flow connection between the exhaust port 92 and passage 60 such that disengagement of the torque converter clutch 40 will not occur at this time.

While the above control system has been described as controlling a torque converter clutch, it will be obvious to those skilled in the art that the system can be incorporated to provide momentary disengagement of any friction device such as an input clutch or a continuously engaged reaction member. It is also obvious that the friction device 58 can be a clutch or a brake and when used with a four-speed transmission having overdrive, such as that shown in the above-mentioned Borman patent, the friction device would be a brake.

Obviously, many modifications and variations of the present invention are possible in light of the above teaching. It is therefore to be understood that within the scope of the appended claims, the invention may be practiced otherwise than as specifically described.

The embodiments of the invention in which an exclusive property or privilege is claimed are defined as follows:

1. A control valve for use in a power transmission having a pair of friction drive establishing means, one of which drive establishing means is controlled by an electrically-operated solenoid valve and the other of which drive establishing means is controlled by a hydraulically-operated shift valve, said control valve comprising; a stepped valve bore, a differential area spool valve slidably disposed in the stepped valve bore and a passage means interconnecting the hydraulic shift valve and the differential area of said valve spool, a restricted exhaust being interconnected with said passage means; and electrical switch means connected in said passage means upstream of said restricted exhaust and being pressure-activated to assume an actuated position to control the solenoid valve to disengage said one drive establishing means, said passage means being operable to provide a controlled pressure outlet in cooperation with said valve spool and said restricted exhaust for said other drive establishing means such that on disengagement of said other drive establishing means the pressure within said passage means is initially increased sufficiently to actuate said switch means and after a predetermined time the pressure therein is reduced through said restricted exhaust to permit said switch means to return to its unactuated condition.

2. A control valve structure for use in a power transmission having a pair of friction clutch means, one of which clutch means is controlled by an electrically-operated solenoid valve and the other of which clutch means is controlled by a hydraulically-operated shift valve, said control valve structure comprising; a stepped valve bore, a differential area spool valve slidably disposed in the stepped valve bore and a passage means interconnecting the hydraulic shift valve and the differential area of said valve spool, a restricted exhaust being interconnected with said passage means; and electrical switch means connected in said passage means upstream of said restricted exhaust and being pressure-activated to assume an actuated postion to control the solenoid valve to disengage said one clutch means, said passage means being operable to provide a controlled pressure outlet in cooperation with said valve spool and said restricted exhaust for said other clutch means such that on disengagement of said other clutch means the pressure within said passage means is initially increased sufficiently to actuate said switch means and after a predetermined time the pressure therein is reduced through said restricted exhaust to permit said switch means to return to its unactuated condition.

3. A control valve structure for use in a power transmission having a friction clutch means and a friction brake means, said clutch means being controlled by an electrically-operated solenoid valve and said brake means being controlled by a hydraulically-operated shift valve, said control valve structure comprising; a stepped valve bore, a differential area spool valve slidably disposed in the stepped valve bore and a passage means interconnecting the hydraulic shift valve and the differential area of said valve spool, a restricted exhaust being interconnected with said passage means; and electrical switch means connected in said passage means upstream of said restricted exhaust and being pressure-activated to assume an actuated position to control the solenoid valve to disengage said clutch means, said passage means being operable to provide a controlled pressure outlet in cooperation with said valve spool and said restricted exhaust for said brake means such that on disengagement of said other brake means the pressure within said passage means is initially increased sufficiently to actuate said switch means and after a predetermined time the pressure therein is reduced through said restricted exhaust to permit said switch means to return to its unactuated condition.

4. A control valve structure for use in a power transmission having torque converter clutch means and a drive ratio establishing means, said torque converter clutch means being controlled by an electrically-operated solenoid valve and the drive ratio establishing means being controlled by a hydraulically-operated shift valve, said control valve structure comprising; a stepped valve bore, a differential area spool valve slidably disposed in the stepped valve bore and a passage means interconecting the hydraulic shift valve and the differential area of said valve spool, a restricted exhaust being interconnected with said passage means; and electrical switch means connected in said passage means upstream of said restricted exhaust and being pressure-activated to assume an actuated position to control the solenoid valve to disengage said torque converter clutch means, said passage means being operable to provide a controlled pressure outlet in cooperation with said valve spool and said restricted exhaust for said drive ratio establishing means such that on disengagement of said drive ratio establishing means the pressure within said passage means is initially increased sufficiently to actuate said switch means and after a predetermined time the pressure therein is reduced through said restricted exhaust to permit said switch means to return to its unactuated condition.

* * * * *